A. MEUCCI.
Candle Mold.
No. 30,180.
Patented Sept. 25, 1860.
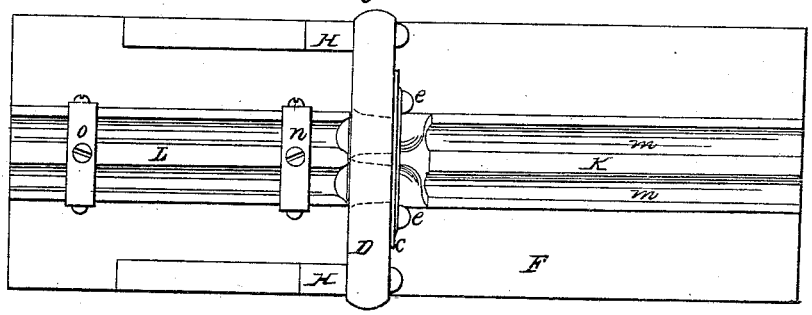
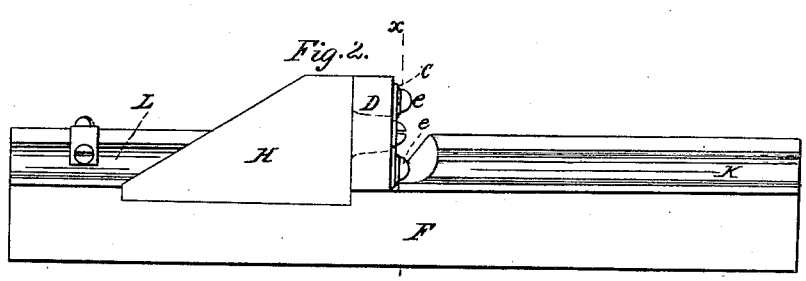
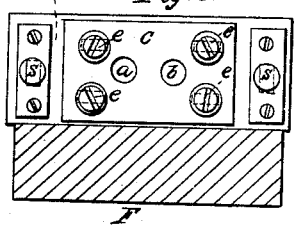
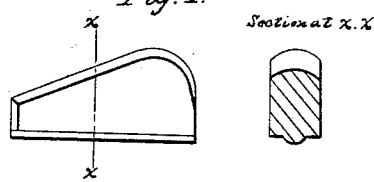
Witnesses:
Eugen Sieber
David Whiting
Inventor:
Antonio Meucci

UNITED STATES PATENT OFFICE.

ANTONIO MEUCCI, OF CLIFTON, NEW YORK, ASSIGNOR TO THE NEW YORK PARAFFINE CANDLE CO., OF RICHMOND COUNTY, NEW YORK.

APPARATUS FOR MOLDING CANDLES.

Specification of Letters Patent No. 30,180, dated September 25, 1860.

*To all whom it may concern:*

Be it known that I, ANTONIO MEUCCI, of Clifton, in the county of Richmond and State of New York, have invented a new and useful Apparatus for Finishing Candles; and I do hereby declare that the following is a full, clear, and exact description of the same, reference being had to the accompanying drawing, in which—

Figure 1 represents a plan of my apparatus. Fig. 2 a side elevation of it. Fig. 3 a cross section of it at the line $x$ $x$ of Fig. 2, and Fig. 4 represents a side view and cross section of the driver used in connection with the apparatus.

Candles after casting, and particularly paraffin candles, frequently have a surface which is not sufficiently smooth and polished for the market. They are also slightly tapering from the necessity of making the molds tapering to permit the candles to be drawn out of them.

The invention which is the subject of this patent is an apparatus for the purpose of paring and polishing the candles after they are taken from the molds, so as to render them cylindrical and impart an even polished surface to them.

This apparatus consists, essentially, of a combination of a candle guide and circular die so arranged relatively to each other that the candle is guided in a straight line through the die when the candle is propelled forward either by hand or by other means.

The most convenient method of constructing my apparatus with which I am acquainted is to mount one or more dies upon a base, with a horizontal candle guide in front of them, to guide the candles through the dies, and a similar horizontal guide or bed behind them, to receive the candle as it issues from the dies. In the present example there are two dies $a$ and $b$, which are formed in a steel plate $c$, that is supported by a rest D. The die plate is secured to the rest by means of screws $e$ passing through slots in the die plate, so that it may be moved crosswise to the base F to adjust in one direction the positions of the dies to that of the guide which precedes them. The rest is supported upon the base F of the apparatus by a pair of brackets H H, to which it is secured by means of screws $s$ $s$, that pass through vertical slots made in it, so that this rest with the die plate may be adjusted in a vertical direction to place the dies in the right positions with respect to the candle guide which precedes them.

The candle guide K in the present example has the form of a block of greater length than the candles to be finished, so as to support the driver that bears against the butt of the candle, and its upper surface has two shallow grooves $m$ $m$ formed in it corresponding in position with the two dies $a$, $b$. The end of this guide block which is nearer the dies is cut away to permit the parings removed by the dies to escape freely. The dies are followed by a second block L, similar in all respects to that which precedes them, and the office of this block is to furnish a bed to sustain the candles as they issue from the dies. This bed has two elastic straps $n$ and $o$ of vulcanized india rubber secured to it crosswise, to hold the candles in contact with the bed as they move upon its surface. One of the dies ($a$) is made a little smaller in diameter than the other, and each candle is passed through both in succession. The passage through the first die pares off the surface and reduces the candle to a cylindrical form; the passage through the second die removes a fine shaving of the material and leaves the surface beautifully smooth and polished.

In using the apparatus above described the candles are laid in succession upon the candle guide K and are pushed through each die. This operation is conveniently effected by means of a driver such as is represented at Fig. 4, whose lower face fits the groove of the candle guide. This driver is pushed against the butt of the candle lying upon the candle guide, and when the candle is pushed forward as far as possible by the driver, the latter is drawn back and a second candle is laid between it and the butt of the first, so that the propulsion of the second into the die expels the first. The candles as they issue from the dies are received upon the bed and are maintained in contact with it by the elastic straps. Two dies are sufficient to pare mold candles to a cylindrical form and impart a handsome surface to them, but more may be used if found expedient, each succeeding die being made smaller than the preceding one.

The apparatus may be modified in form and construction as deemed expedient, and may be arranged to act upon the candles while in horizontal positions or at any angle of inclination, the construction of its parts being adapted to the change of arrangement as found necessary.

I do not claim a circular die for the purpose of reducing an article in size, but—

What I claim as my invention in candle machinery, and desire to secure by Letters Patent, is—

1. The combination of die and candle guide substantially as herein described for the purpose of finishing candles.

2. The combination of an elastic strap with the receiving bed for the purpose of holding the candle in contact therewith.

3. The combination of die, candle guide, and candle receiving bed, substantially in the manner and for the purpose herein described.

In testimony whereof I have hereunto subscribed my name.

ANTONIO MEUCCI.

Witnesses:
EUGENE SIEBER,
DAVID WHITING.